United States Patent
McNew

(10) Patent No.: US 10,232,711 B2
(45) Date of Patent: Mar. 19, 2019

(54) SPATIOTEMPORAL DISPLAYS FOR SET SPEED DEVIATION OF A VEHICLE

(71) Applicant: Toyota Motor Engineering & Manufacturing North America, Inc., Erlanger, KY (US)

(72) Inventor: John-Michael McNew, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 326 days.

(21) Appl. No.: 15/173,598

(22) Filed: Jun. 3, 2016

(65) Prior Publication Data
US 2017/0349045 A1    Dec. 7, 2017

(51) Int. Cl.
*B60K 31/18* (2006.01)
*B60K 35/00* (2006.01)
*B60W 40/105* (2012.01)

(52) U.S. Cl.
CPC .............. *B60K 35/00* (2013.01); *B60K 31/18* (2013.01); *B60W 40/105* (2013.01); *B60K 2350/106* (2013.01)

(58) Field of Classification Search
CPC ... G01P 1/08; G01P 1/11; B60K 31/18; B60K 31/185; B60K 2310/22; B60K 2350/1072; B60K 2350/2065; B60K 2350/352; B60W 40/105
See application file for complete search history.

(56) References Cited

U.S. PATENT DOCUMENTS

| | | | |
|---|---|---|---|
| 5,014,200 A | 5/1991 | Chundrlik et al. | |
| 5,838,259 A * | 11/1998 | Tonkin | B60Q 1/444 340/903 |
| 6,226,588 B1 * | 5/2001 | Teramura | B60K 31/0008 123/319 |
| 6,497,297 B1 | 12/2002 | Ebert et al. | |
| 6,789,637 B1 | 9/2004 | Winner et al. | |
| 8,174,375 B2 | 5/2012 | Fong et al. | |
| 8,358,808 B2 | 1/2013 | Malinovskiy et al. | |
| 8,676,431 B1 | 3/2014 | Mariet et al. | |
| 8,885,039 B2 | 11/2014 | Jang et al. | |

(Continued)

FOREIGN PATENT DOCUMENTS

DE 102014214514 A1  1/2016
FR     2927707 A1     8/2009

(Continued)

*Primary Examiner* — Jelani A Smith
*Assistant Examiner* — Donald J Wallace
(74) *Attorney, Agent, or Firm* — Christopher G. Darrow; Darrow Mustafa PC

(57) ABSTRACT

Arrangements described herein can display a set speed deviation for a vehicle using spatiotemporal patterns. A set speed and an actual speed for a vehicle can be acquired. A deviation between the set speed and the actual speed of the vehicle can be determined. Responsive to determining the deviation between the predetermined set speed and the actual speed, a spatiotemporal pattern can be displayed within the vehicle. The spatiotemporal pattern can indicate to a user the deviation between the set speed and the actual speed via the spatiotemporal pattern. In one or more arrangements, the spatiotemporal pattern can be a repeating wave pattern.

17 Claims, 9 Drawing Sheets

(56) References Cited

U.S. PATENT DOCUMENTS

| | | |
|---|---|---|
| 9,037,389 B2 | 5/2015 | You |
| 9,157,761 B2 | 10/2015 | Levin |
| 9,164,507 B2 | 10/2015 | Cheatham, III et al. |
| 9,165,468 B2 | 10/2015 | Luo et al. |
| 9,187,095 B2 | 11/2015 | Gerdt |
| 9,189,961 B2 | 11/2015 | Mehr et al. |
| 9,403,555 B2 | 8/2016 | Ueda et al. |
| 9,511,764 B2 | 12/2016 | Pilutti et al. |
| 9,518,829 B2 | 12/2016 | Parker et al. |
| 9,605,971 B2 | 3/2017 | Niehsen et al. |
| 9,669,833 B2 | 6/2017 | Abdel-Rahman et al. |
| 9,726,514 B2 | 8/2017 | Pudiyathanda et al. |
| 2002/0121398 A1 | 9/2002 | Kikuchi et al. |
| 2002/0133285 A1* | 9/2002 | Hirasago ............ B60K 31/0008 701/96 |
| 2003/0139871 A1 | 7/2003 | Miller et al. |
| 2003/0164756 A1* | 9/2003 | Hayashi ................ B60K 35/00 340/439 |
| 2005/0259033 A1 | 11/2005 | Levine |
| 2007/0083318 A1 | 4/2007 | Parikh |
| 2008/0021627 A1 | 1/2008 | Johnsson |
| 2009/0210110 A1* | 8/2009 | Dybalski ............ B60K 35/00 701/31.4 |
| 2011/0208399 A1 | 8/2011 | Fekete et al. |
| 2013/0066511 A1 | 3/2013 | Switkes et al. |
| 2013/0201335 A1 | 8/2013 | Heinemann |
| 2014/0182508 A1 | 7/2014 | Oishi |
| 2014/0222244 A1* | 8/2014 | Ogawa .................... G01P 1/103 701/1 |
| 2014/0222277 A1 | 8/2014 | Tsimhoni et al. |
| 2014/0277988 A1* | 9/2014 | Franganillo ............ B60K 31/00 701/93 |
| 2014/0300459 A1* | 10/2014 | Oishi ................ B60K 31/0008 340/441 |
| 2015/0109756 A1* | 4/2015 | Choi ..................... B60K 37/02 362/23.01 |
| 2015/0154872 A1 | 6/2015 | Schafer et al. |
| 2015/0367732 A1* | 12/2015 | Becker ................... B60K 37/02 116/62.4 |
| 2016/0037021 A1 | 2/2016 | Narumi |
| 2016/0366598 A1 | 12/2016 | Gallagher |
| 2017/0021765 A1 | 1/2017 | Mori et al. |
| 2017/0225691 A1 | 8/2017 | Yamada et al. |

FOREIGN PATENT DOCUMENTS

| | | |
|---|---|---|
| JP | 410086698 A | 4/1998 |
| JP | 411042957 A | 2/1999 |
| JP | 2000285381 A | 10/2000 |
| JP | 2001034897 A | 2/2001 |
| JP | 2002046501 A | 2/2002 |
| JP | 2008098931 A | 4/2008 |
| JP | 2014133444 A | 7/2014 |
| JP | 2015170095 A | 9/2015 |

* cited by examiner

SPATIOTEMPORAL DISPLAYS FOR SET SPEED DEVIATION OF A VEHICLE

FIELD

The subject matter described herein relates in general to in-vehicle displays and, more particularly, to in-vehicle displays configured to present spatiotemporal patterns.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment. The vehicles can be configured to travel at a desired set speed during a portion of travel. The surrounding environment may affect the determination of how to navigate and/or maneuver the vehicle through the surrounding environment. Thus, the vehicle's actual speed can, at times, vary from the set speed. In non-autonomous driving, the driver is monitors the roadway and the vehicles speed is easy to detect from visual cues in the roadway such as optical flow. Often times drivers are able to perform this monitoring using visual cues in an intuitive and mainly unconscious mode that is different than a conscious comparison of the displayed set speed with the displayed current speed that are provided in current vehicles. In various forms of automated driving, there may not be an expectation that driver's will monitor the roadway while the vehicle is in motion.

SUMMARY

In one respect, the present disclosure is directed to a method of displaying set speed deviation for a vehicle. The method can include acquiring a set speed for the vehicle and acquiring, using one or more sensors, an actual speed of the vehicle. The method can further include determining a deviation between the set speed and the actual speed. Responsive to determining the deviation between the set speed and the actual speed, a spatiotemporal pattern can be caused to be displayed within the vehicle, the spatiotemporal pattern indicating the deviation between the set speed and the actual speed via a repeating pattern.

In another respect, the present disclosure is directed to a display system for a vehicle. The system can include a vehicle component configured to acquire a set speed for the vehicle and a sensor system, the sensor system being configured to acquire an actual speed of the vehicle. The system can further include a processor operatively connected to the vehicle component and the sensor system. The processor can be programmed to initiate executable operations including determining a deviation between the set speed and the actual speed. The executable operations can further include causing a spatiotemporal pattern to be displayed within the vehicle, the spatiotemporal pattern indicating the deviation between the set speed and the actual speed via a repeating wave pattern.

In still another respect, the present disclosure is directed to a method of displaying set speed deviation for a vehicle. The method can include acquiring a set speed for the vehicle and acquiring, using one or more sensors, an actual speed of the vehicle. The method can further include determining a deviation between the set speed and the actual speed. Responsive to determining the deviation between the set speed and the actual speed, a spatiotemporal pattern can be caused to be displayed within the vehicle. The spatiotemporal pattern can include a repeating wave pattern moving away from a wave source. A frequency of the wave pattern can indicate an amount of deviation between the set speed and the actual speed, and a direction of the wave pattern can indicate whether the actual speed is greater than or less than the set speed.

In yet another respect, the present disclosure is directed to a method of displaying set speed deviation for a vehicle. The method can include acquiring a set speed for the vehicle and acquiring, using one or more sensors, an actual speed of the vehicle. The method can further include determining a deviation between the set speed and the actual speed. Responsive to determining the deviation between the set speed and the actual speed, a spatiotemporal pattern can be caused to be displayed within the vehicle. The spatiotemporal pattern can include a first wave pattern having a first frequency and a second wave pattern having a second frequency. The first wave pattern can indicate the set speed and the second wave pattern can indicate the actual speed. The deviation between the set speed and the actual speed can be indicated by the difference in frequency between the first frequency and the second frequency.

DETAILED DESCRIPTION

Figure 1:
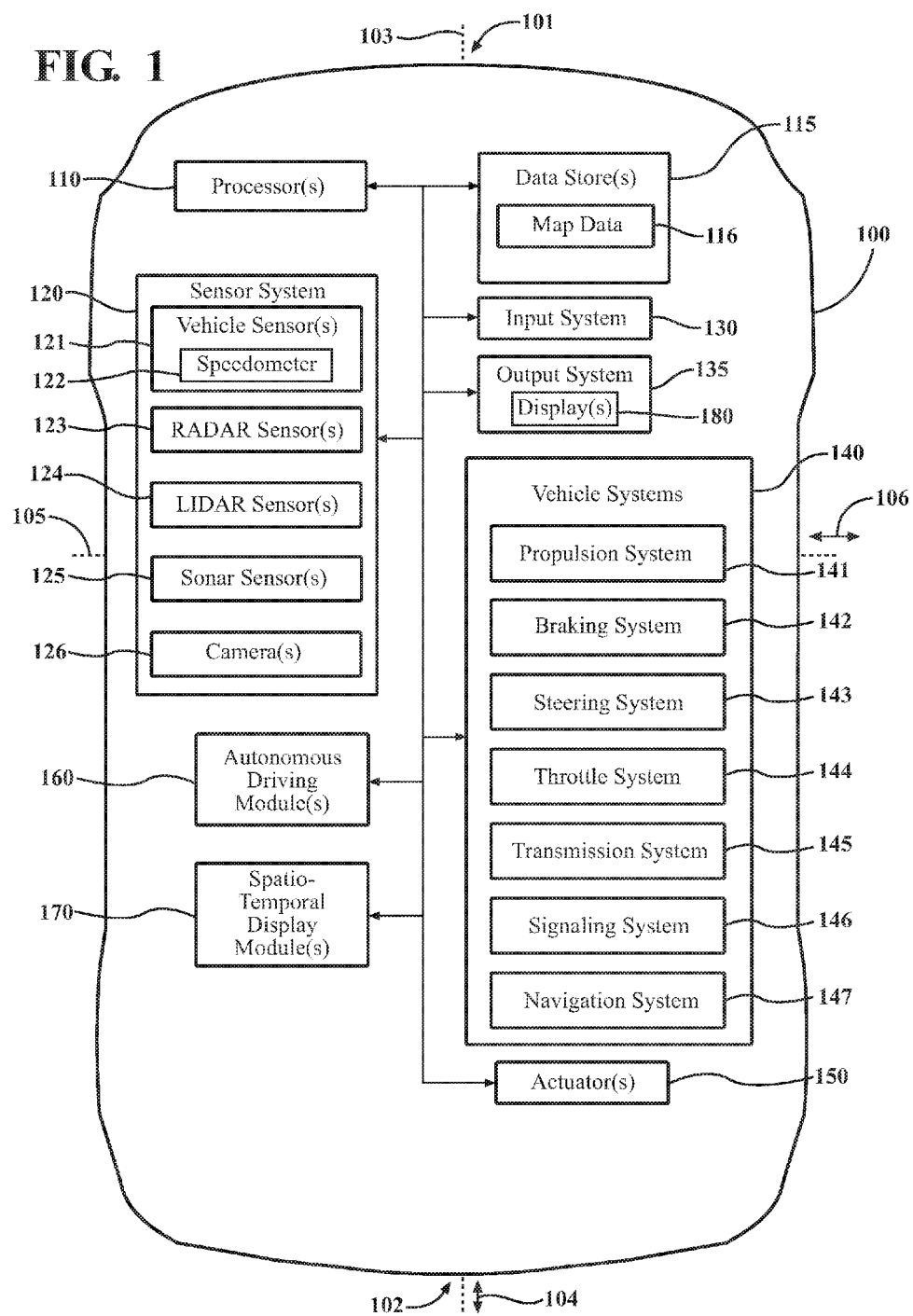
FIG. 1 is an example of a vehicle.

Arrangements described herein can display a set speed deviation for a vehicle using spatiotemporal patterns to convey information to an occupant of the vehicle in an intuitive and mainly unconscious manner. A set speed and an actual speed for a vehicle can be acquired. A deviation between the set speed and the actual speed of the vehicle can be determined. Responsive to determining the deviation between the predetermined set speed and the actual speed, a spatiotemporal pattern can be displayed within the vehicle. The spatiotemporal pattern can indicate to a user the deviation between the set speed and the actual speed via the spatiotemporal pattern. In one or more arrangements, the spatiotemporal pattern can be a repeating wave pattern. The present detailed description relates to systems and methods that incorporate one or more of such features. In at least some instances, such systems, methods and computer program products can improve the performance and/or the safe operation of a vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8D, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous operational mode. "Autonomous operational mode" means that one or more computing systems are used to navigate and/or maneuver the vehicle along a travel route with a level of input from a human driver which varies with the operational mode. In one or more arrangements, the vehicle 100 can be highly automated. The systems and components described herein may be configured to communicate and cooperate so as to operate the vehicle in one or more of the autonomous operational modes described below.

The vehicle 100 can have a plurality of autonomous operational modes. For instance, the vehicle 100 can have an unmonitored autonomous operational mode. "Unmonitored autonomous operational mode" means that one or more computing systems are used to maneuver the vehicle along a travel route with no input or supervision required from a human driver. One example of an unmonitored autonomous operational mode is described in the definition of vehicle automation Level 4 (L4), as set forth in the National Highway Traffic Safety Administration in its Preliminary Statement of Policy Concerning Automated Vehicles (May 30, 2013) ("NHTSA 2013 Policy"), which is incorporated herein by reference.

The vehicle 100 can have a monitored autonomous operational mode. "Monitored autonomous operational mode" means that one or more computing systems are used to navigate and/or maneuver the vehicle with at least some human driver supervision and/or control required. One example of a monitored autonomous operational mode is described in the definition of vehicle automation Level 3 or L3, as set forth in the NHTSA 2013 Policy. In some instances, when the vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

Alternatively or in addition to the above-described modes, the vehicle 100 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. Examples of semi-autonomous operational modes are described in the definitions of vehicle automation Levels 2 (L2) and/or Level 1 (L1), as set forth in the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

Alternatively or in addition to the above-described modes, the vehicle 100 can have a manual operational mode. "Manual operational mode" means that a substantial majority or all of the navigation and/or maneuvering of the vehicle along a travel route is performed by a human driver with minimal or no input from (or operation of the vehicle by) a computing system. One example of a manual operational mode is described in the definition of vehicle automation Level 0 (L0), as set forth in the NHTSA 2013 Policy.

The vehicle 100 can be configured to be switched between the various operational modes. Such switching can be implemented in any suitable manner, now known or later developed. The switching can be performed automatically, or it can be done responsive to receiving a manual input or request.

In some instances, the vehicle 100 may be a conventional vehicle. A conventional vehicle is not configured for autonomous driving. Thus, a conventional vehicle does not have an autonomous operational mode. However, a conventional vehicle may have one or more semi-autonomous modes or features (e.g., cruise control, adaptive cruise control, lane keeping, etc.). However, in one or more arrangements, the conventional vehicle may not have semi-autonomous mode(s) or feature(s). In some instances, a conventional vehicle may be operable in only a manual operational mode. It will be appreciated that arrangements described herein are applicable to autonomous vehicles operating in any of the above-described modes, conventional vehicles, and/or other types of vehicles.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements. In some instances, one or more of these elements may be a part of an autonomous driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100. For instance, the processor(s) 110 can be an electronic control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. The map data can include information or data on roads, traffic control devices, road markings, features, structures, and/or landmarks in the one or more geographic areas. The map data can be in any suitable form. In one or more arrangements, the map data can include information related to a speed for a roadway. For example, the map data can include speed limits. In some arrangements, the map data can include information on past and/or present speed information for vehicles traveling on roads. For example, the map data can include average speeds for vehicles traveling on a road as compiled over a given time period. Further, the map data can include current speeds of vehicles on the road. The map data can be high quality and/or highly detailed.

In some instances, at least a portion of the map data can be located in one or more data stores 115 located onboard the vehicle 100. Alternatively or in addition, at least a portion of the data can be located in a data store or source that is located remote from the vehicle 100 (for example, in a GPS system accessible through an in-vehicle GPS receiver). The data can be obtained by the vehicle 100 in any suitable manner, or it can be provided by an entity (e.g., a vehicle manufacturer) for use by the vehicle 100.

The vehicle 100 can include a sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the vehicle 100 itself. In one or more arrangements, the vehicle sensor(s) 121 can be configured to detect, determine, assess, monitor, measure, quantify and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the vehicle 100.

In one or more arrangements, the vehicle sensor(s) 121 can include a speedometer 122. The speedometer can determine a current speed of the vehicle 100, or data acquired by the speedometer can be used to determine a current speed of the vehicle 100. The speedometer 122 can include any type of device, including mechanical and/or electronic speedometers. In one or more arrangements, the speedometer 122 can include a GPS. For example, the GPS can be configured to determine how far a GPS receiver has moved position for a given time. The speedometer 122 can include components of the navigation system 147.

Alternatively or in addition, the sensor system 120 can include one or more driving environment sensors configured to acquire, detect, determine, assess, monitor, measure, quantify and/or sense driving environment data. "Driving environment data" includes and data or information about the external environment in which a vehicle is located or one or more portions thereof.

As an example, in one or more arrangements, the sensor system 120 can include one or more RADAR sensors 123. "RADAR sensor" means any device, component and/or system that can detect, determine, assess, monitor, measure, quantify and/or sense something using at least in part radio signals. The one or more RADAR sensors 123 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more RADAR sensors 123, or data obtained thereby, can determine the speed of objects in the external environment of the vehicle 100.

In one or more arrangements, the sensor system 120 can include one or more LIDAR sensors 124. "LIDAR sensor" means any device, component and/or system that can detect, determine, assess, monitor, measure, quantify and/or sense objects using at least in part lasers. The LIDAR sensor can include a laser source and/or laser scanner configured to emit a laser signal and a detector configured to detect reflections of the laser signal. The one or more LIDAR sensors 124 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

In one or more arrangements, the sensor system 120 can include one or more sonar sensors 125. "Sonar sensor" means any device, component and/or system that can detect, determine, assess, monitor, measure, quantify and/or sense something using at least in part sound waves. The one or more sonar sensors 125 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented, positioned, configured, operable, and/or arranged to capture visual data from at least a portion of the external environment of the vehicle 100. Visual data acquired by the one or more cameras 126 can be used to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

The sensor system 120, the processor(s) 110, and/or one or more other elements of the vehicle 100 can be operable to control movements of one or more of the sensors of the sensor system 120. It should be noted that any of the sensors described herein can be provided in any suitable location with respect to the vehicle 100. For instance, one or more sensors can be located within the vehicle 100, one or more sensors can be located on the exterior of the vehicle 100 and/or one or more sensors can be located so as to be exposed to the exterior of the vehicle 100.

Alternatively or in addition to one or more of the above examples, the sensor system 120 can include one or more sensors configured to detect, determine, assess, monitor, measure, quantify and/or sense the location of the vehicle 100 and/or the location of objects in the environment relative to the vehicle 100. Any suitable sensor can be used for such purposes. Such sensors may work independently and/or in combination with a positioning system of the vehicle 100.

The vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include one or more displays 180. "Display" is defined as a component or a group of components that present information/data in a form that is perceptible to the human sense of sight. For instance, the display 180 can present video, images, graphics, etc. The display 180 can be any suitable type of display. For instance, the display 180 can be a liquid crystal display (LCD), a light emitting diode (LED) display or some other suitable display. In one or more arrangements, the display 180 can be a heads-up display, a display for a navigation system, and/or a display included in an instrument cluster. The display(s) 180 can be provided in any suitable location within the vehicle 100. In one or more arrangements, the display(s) 180 can be located in a front interior portion of the vehicle 100. As an example, the display(s) 180 can be included in a dashboard or instrument panel (not shown) of the vehicle 100.

The vehicle 100 can include one or more modules, at least some of which will be described herein. Each module can be implemented as computer readable program code that, when executed by a processor, implement one or more of the various processes described herein. One or more of the modules can be a component of the processor(s) 110, or one or more of the modules can be executed on and/or distributed among other processing systems and/or elements to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, the hardware and/or software elements configured for performing the functions of a particular module may be distributed among a plurality of elements and/or locations. In one or more arrangements, two or more of the modules described herein can be combined into a single module.

The vehicle 100 can include one or more autonomous driving modules 160. The autonomous driving module(s) 160 can receive data from the sensor system 120, the input system 130, and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, capture, and/or determine location information for objects within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 in respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

The vehicle 100 can include one or more spatiotemporal display modules 170. The spatiotemporal display module(s) 170 can be configured to cause visual spatiotemporal patterns to be displayed within the vehicle 100. As used herein, "spatiotemporal" and "spatiotemporal patterns" can include any images that change over time. For example, spatiotemporal images can include images that change shape, size, configuration, location, color, and/or orientation over a period of time.

In one or more arrangements, the spatiotemporal display module(s) 170 can be configured to acquire information relating to a set speed of the vehicle 100. "Set speed" can include any target and/or reference speed for the vehicle 100. In one or more arrangements, the set speed can be determined by a user of the vehicle 100. For example, the set speed can be a desired speed for the vehicle 100 as chosen by an occupant of the vehicle 100. In one or more arrangements, the user can input the set speed to the vehicle 100 through the input system 130.

In one or more arrangements, the set speed can be determined by, and acquired from, one or more components of an autonomous driving system of the vehicle 100. For example, the set speed can be acquired from the autonomous driving module(s) 160, the processor(s) 110, and/or the data store(s) 115. In arrangements where the set speed is acquired from components of an autonomous driving system, the set speed can be determined in any suitable way. For example, the autonomous driving module(s) 160 and/or the processor(s) 110 can determine the set speed based on one or more factors, including the map data 116, information received from the sensor system 120, and/or information received from the vehicle systems 140.

The set speed can be determined based on any suitable factors. The set speed can be determined based on environmental conditions, roadway speed limits, traffic congestion, condition of vehicle system(s), driver confidence and/or experience, and/or speed of other vehicles, just to name some non-limiting examples. In some arrangements, the set speed can be a measurement of a distance traveled for a given time period. For example, the set speed can be a measurement having units of miles per hour (mph), kilometers per hour (kph), feet per second (ft/s), and/or meters per second (m/s) just to name a few possibilities.

In one or more arrangements, a user and/or the autonomous driving module(s) 160 can determine a set speed for the vehicle 100 that is a numerical value. For example, a user and/or the autonomous driving module(s) 160 can input a set speed substantially equal to a speed limit for a particular road. In some arrangements, the set speed can be a value offset from a current speed limit. For example, a user can choose to set a set speed that is offset (above or below) a speed limit on a current road of travel. In one or more arrangements, the set speed can be a fixed value. Alternatively or in addition, the set speed can be a dynamic value that changes over time.

In some arrangements, the set speed can be a relative measurement, determined relative to a physical reference. For example, the set speed can be approximately the speed of another vehicle. In one or more arrangements, the set speed can be the speed of a vehicle located in front of the vehicle 100 when an adaptive cruise control and/or lane keeping system is activated.

In one or more arrangements, the spatiotemporal display module(s) 170 can be configured to acquire information relating to an actual speed of the vehicle 100. For example, the actual speed of the vehicle 100 can be acquired from the speedometer 122 and/or the processor(s) 110. As used herein, "actual speed" means a travel speed of the vehicle 100. In some arrangements, the actual speed can be a measurement of a distance traveled for a given time period. For example, the actual speed can be a measurement having units of miles per hour (mph), kilometers per hour (kph), feet per second (ft/s), and/or meters per second (m/s) just to name a few possibilities. In some arrangements, the actual speed can be a relative measurement, determined relative to a physical reference.

In one or more arrangements, the spatiotemporal display module(s) 170 can be configured to determine a deviation between the set speed and the actual speed of the vehicle 100. For example, the spatiotemporal display module(s) 170 can compare the set speed and the actual speed to determine an amount of deviation. In one or more arrangements, the deviation can be a numeric value (e.g., 5 mph). Alternatively or in addition, the deviation can be determined to be within a range of values (e.g., 1-5 mph, 5-10 mph, 10-15 mpg, etc.). In one or more arrangements, the determining the deviation can be done continuously. Alternatively, the determining can be done at regular, irregular, or even random intervals.

Responsive to determining a deviation between the set speed and the actual speed of the vehicle, the spatiotemporal display module(s) 170 can be configured to cause visual spatiotemporal patterns to be displayed within the vehicle 100. Such causing can be performed by one or more elements of the vehicle 100, such as the spatiotemporal display module(s) 170, the autonomous driving module(s) 160, and/or the processor(s) 110. The spatiotemporal patterns can have any suitable form that changes over space and time. In one or more arrangements, spatiotemporal patterns can include repeating patterns, such as moving images of ripples and/or waves. For example, various non-limiting examples of spatiotemporal patterns are described below with reference to FIGS. 5A-8D. In one or more arrangements, the spatiotemporal patterns can be viewable on the display(s) 180 of the output system 135.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed.

The navigation system 147 can include one or more mechanisms, devices, elements, components, systems, applications and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

In some instances, such as when the vehicle 100 is an autonomous vehicle, the vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. However, when the vehicle 100 is a conventional vehicle, the vehicle 100 may or may not include the one or more actuators 150.

Figure 2:
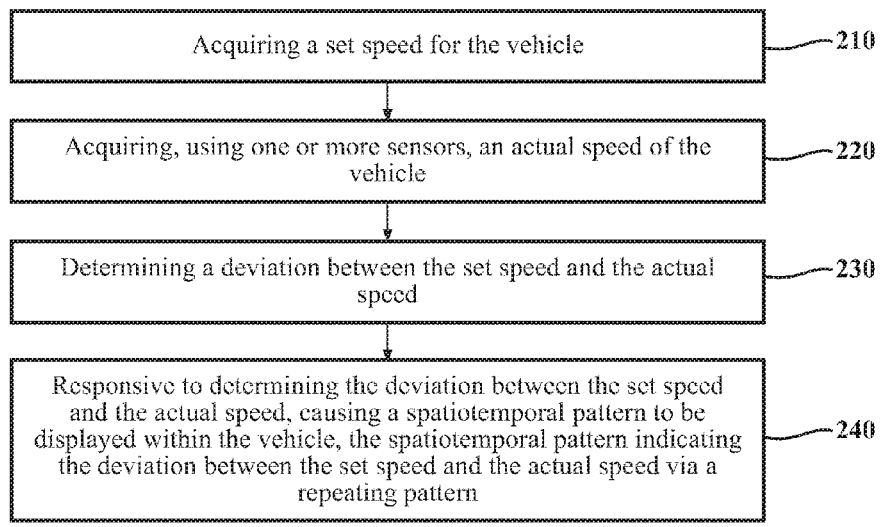
FIG. 2 is a first example of a method of displaying target speed deviation in a vehicle.

Now that the various potential systems, devices, elements and/or components of the vehicle 100 have been described, various methods of displaying set speed deviation for the vehicle 100 will now be described. The methods 200, 300, and 400 illustrated in FIGS. 2-4 may be applicable to the embodiments described above in relation to FIG. 1, but it is understood that the methods 200, 300, and/or 400 can be carried out with other suitable systems and arrangements. Moreover, the methods may include other steps that are not shown here, and in fact, the methods are not limited to including every step shown in FIGS. 2-4. The steps that are illustrated here as part of the methods 200, 300, and/or 400 are not limited to this particular chronological order. Indeed, some of the steps may be performed in a different order than what is shown and/or at least some of the steps shown can occur simultaneously. Referring now to FIG. 2, a first example of a method of displaying set speed deviation for a vehicle is shown. Various possible steps of method 200 will now be described.

Referring now to FIG. 2, a first example of a method of displaying set speed deviation for a vehicle is shown. At block 210, a set speed of the vehicle can be acquired. In one or more arrangements, the set speed can be acquired from a user input, such as from the input system 130. When the vehicle 100 is an autonomous vehicle, the acquiring can be performed while the vehicle 100 is operating in an autonomous operational mode or in any other operational mode that the vehicle 100 is configured to operate in (e.g., semi-autonomous, manual, special, etc.). Further, the set speed of the vehicle 100 can be acquired from one or more autonomous vehicle systems. For example, the set speed can be acquired from the processor(s) 110, data store(s) 115, and/or the autonomous driving module(s) 160. The acquiring can be performed continuously, periodically, irregularly, or even randomly. The method 200 can continue to block 220.

At block 220, an actual speed of the vehicle can be acquired using one or more sensors. When the vehicle 100 is an autonomous vehicle, the acquiring can be performed while the vehicle 100 is operating in an autonomous operational mode or in any other operational mode that the vehicle 100 is configured to operate in (e.g., semi-autonomous, manual, special, etc.). The acquiring can be from one or more vehicle sensors 121. For instance, the actual speed of the vehicle 100 can be acquired from the speedometer 122. The acquiring can be performed continuously, periodically, irregularly, or even randomly. The method 200 can continue to block 230.

At block 230, a deviation between the set speed and the actual speed can be determined. Such a determination can be made by the processor(s) 110, the autonomous diving module(s) 160, and/or the spatiotemporal display module(s) 170. Such a determination can be made continuously, periodically, irregularly, or even randomly. The determination can be made in real-time. The method 200 can continue to block 240.

At block 240, responsive to determining the deviation between the set speed and the actual speed, a spatiotemporal pattern can be caused to be displayed within the vehicle. The spatiotemporal pattern can indicate the deviation between the set speed and the actual speed via a repeating pattern. Such causing can be performed by one or more elements of the vehicle 100, such as the spatiotemporal display module(s) 170 and/or the processor(s) 110.

The spatiotemporal pattern can be in any suitable form that changes over space and time. For example, the spatiotemporal pattern can be a repeating wave pattern originated by an oscillating wave source, as shown in the examples of FIGS. 5A-8D. Such patterns can change shape, configuration, speed, and/or frequency depending on the determined deviation between the set speed and the actual speed. In one or more arrangements, the frequency of the wave pattern(s) can indicate an amount of deviation between the actual speed and the set speed. For example, the greater the deviation, the greater frequency of the oscillation/waves within the wave pattern. The method 200 can end. Alternatively, the method 200 can return to block 210. As a further alternative, the method 200 can include additional and/or alternative blocks (not shown).

Figure 3:
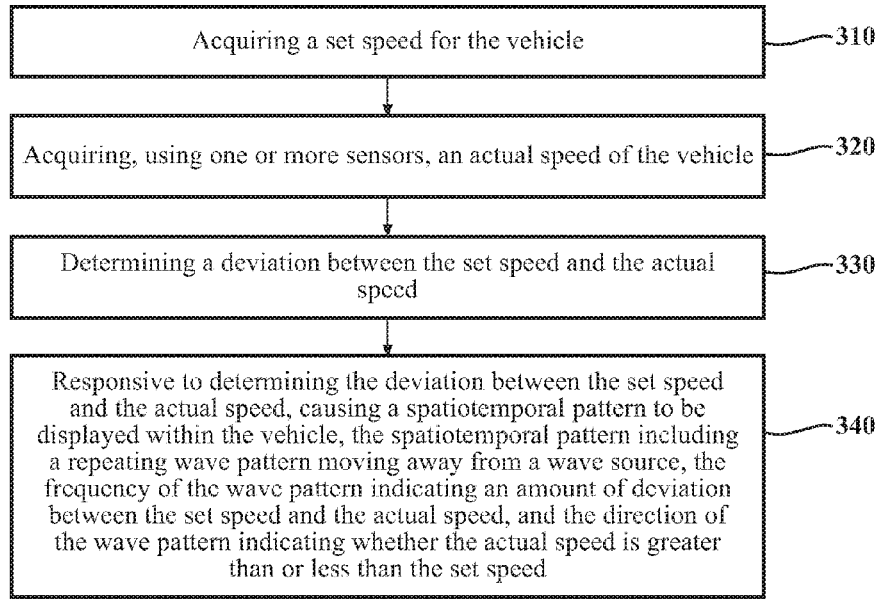
FIG. 3 is a second example of a method of displaying set speed deviation in a vehicle.

Referring to FIG. 3, an example of a method 300 of displaying set speed deviation for a vehicle is shown. At block 310, a set speed of the vehicle can be acquired. At block 320, an actual speed of the vehicle can be acquired from a speedometer. At block 330, a deviation between the set speed and the actual speed can be determined. The above description and examples relating to the blocks 210, 220, and 230 of the method 200 can be applicable to the blocks 310, 320, and 330 of the method 300.

At block 340, responsive to determining the deviation between the set speed and the actual speed, a spatiotemporal pattern can be caused to be displayed within the vehicle. In one or more arrangements, the spatiotemporal pattern can include a repeating wave pattern moving away from a wave source. For example, the spatiotemporal pattern can include wave patterns shown in FIGS. 5A-7C. In one or more examples, the direction of the wave pattern can indicate whether the actual speed is greater than, equal to, or less than, the set speed. For example, the wave pattern can move in a top-to-bottom or downward direction within the display 180 if the actual speed is less than the set speed. The wave pattern can be substantially stationary if the actual speed is substantially equal to the set speed. The wave pattern can move in a bottom-to-top or upward direction within the display 180 if the actual speed is greater than the set speed. In one or more arrangements, the frequency of the wave pattern can indicate an amount of deviation between the set speed and the actual speed. For example, the greater frequency of the wave pattern (faster oscillation and/or wave movements), the greater the deviation between the set speed and the actual speed of the vehicle 100. The method 300 can end. Alternatively, the method 300 can return to block 310. As a further alternative, the method 300 can include additional and/or alternative blocks (not shown).

Figure 4:
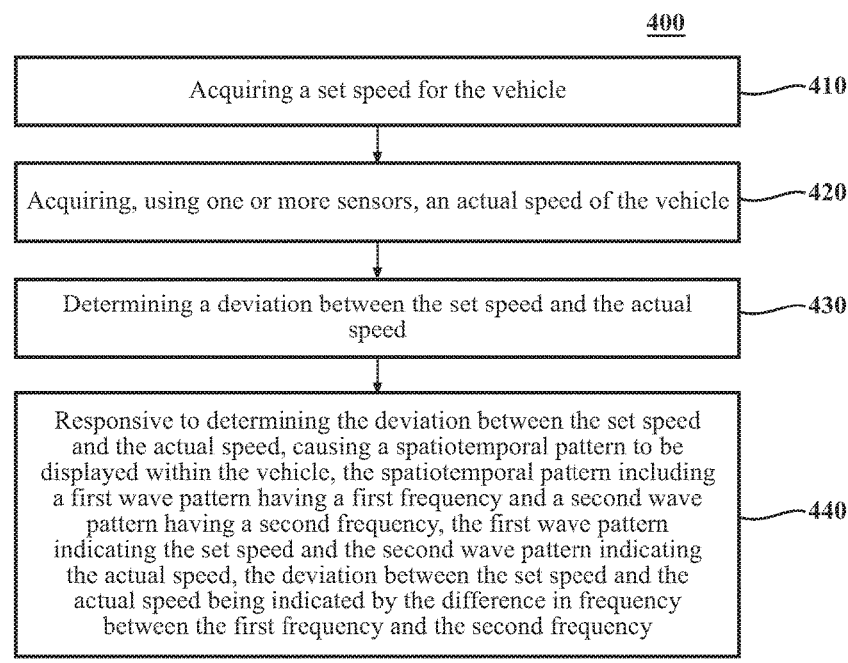
FIG. 4 is a third example of a method of displaying set speed deviation in a vehicle.
Figure 5A:
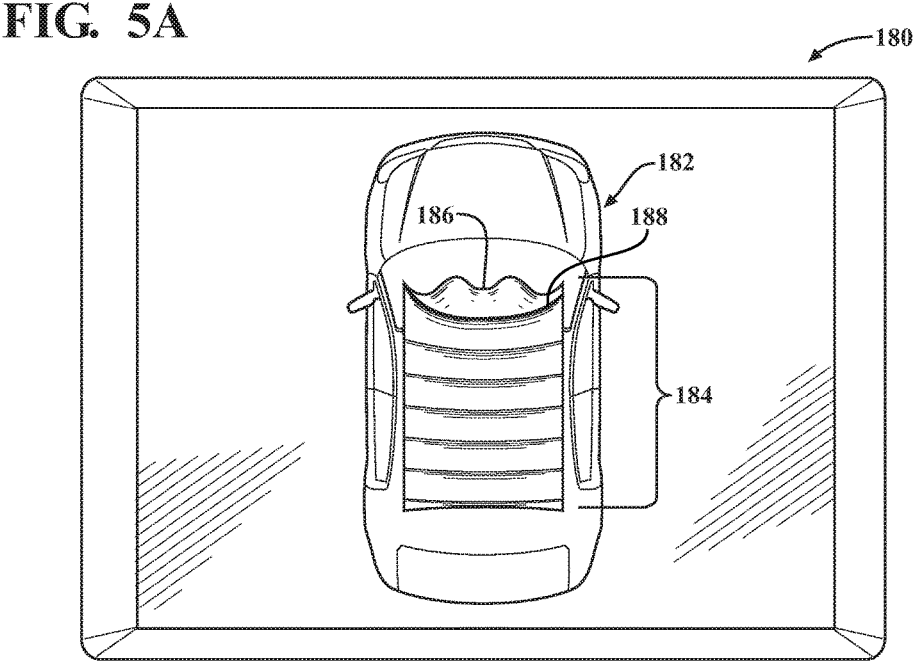
FIGS. 5A-5C show a first set speed deviation in a first example of a spatiotemporal display.
Figure 5B:
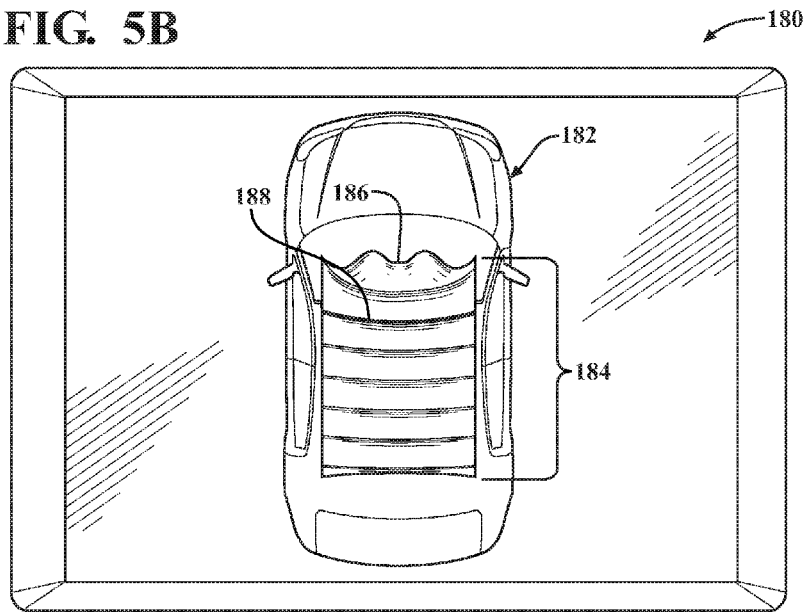
Figure 5C:
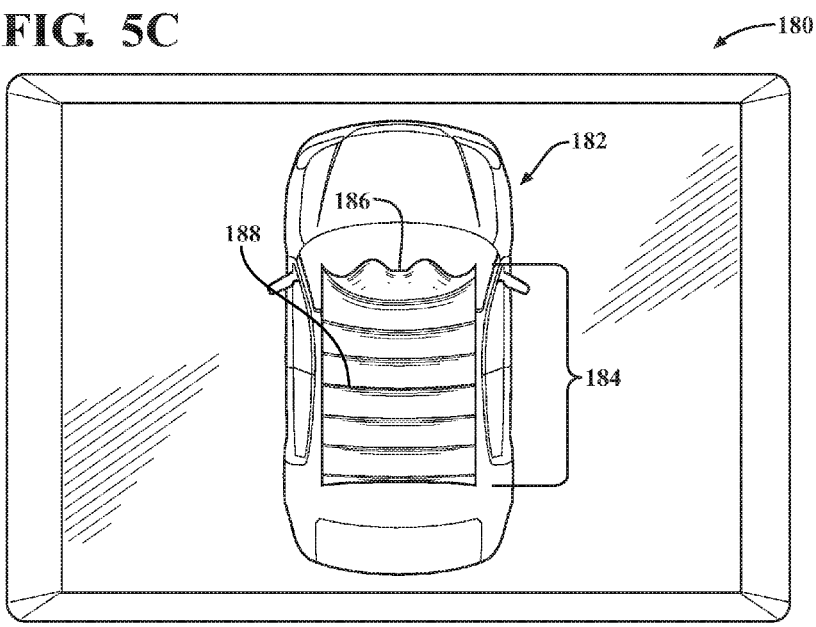
Figure 6A:
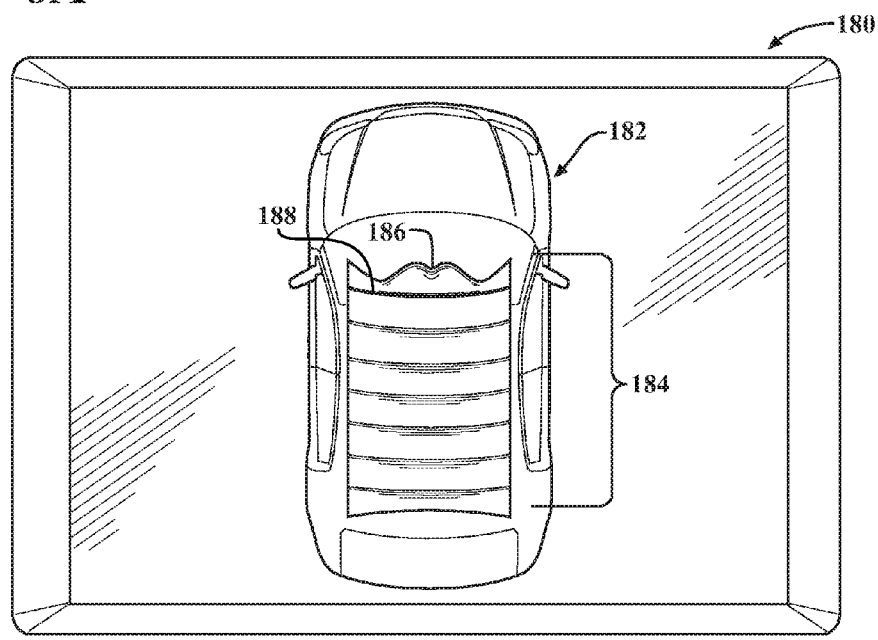
FIGS. 6A-6C show a second set speed deviation in the first example of a spatiotemporal display.
Figure 6B:
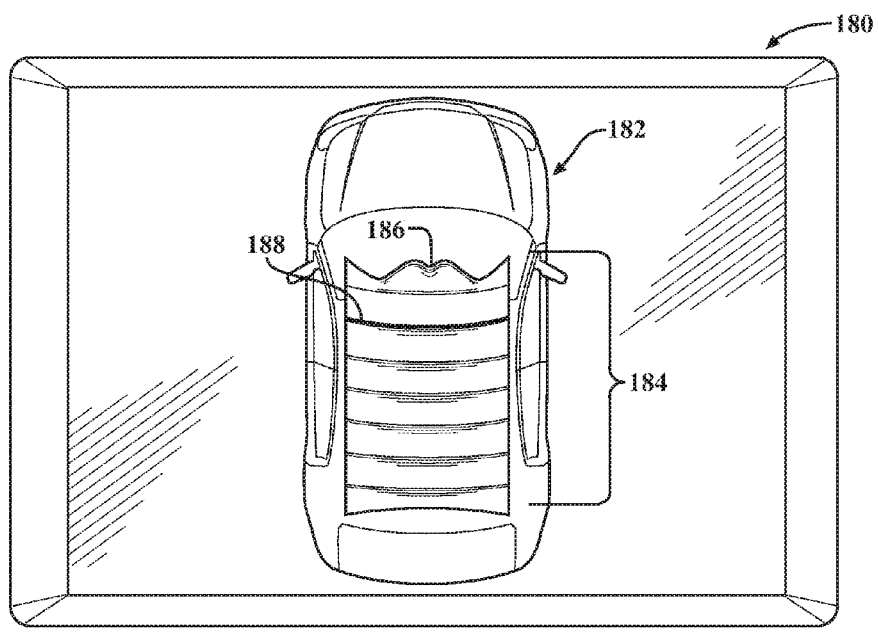
Figure 6C:
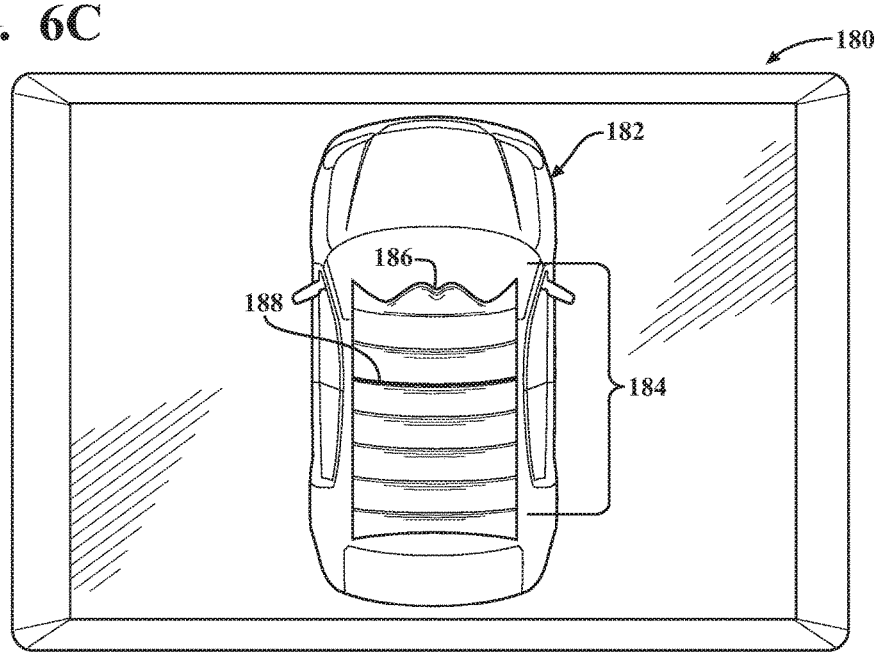
Figure 7A:
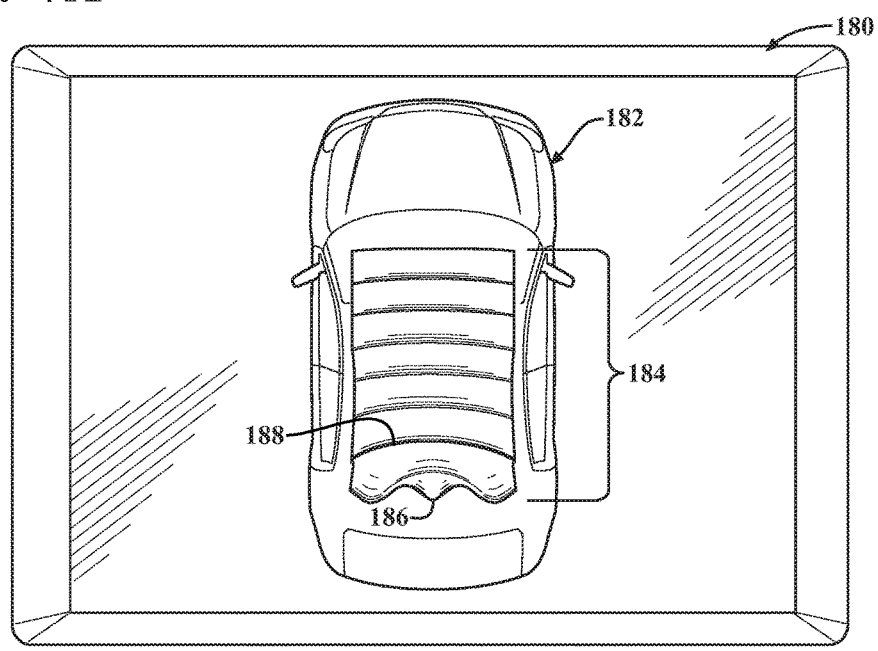
FIGS. 7A-7C show a third set speed deviation in the first example of a spatiotemporal display.
Figure 7B:
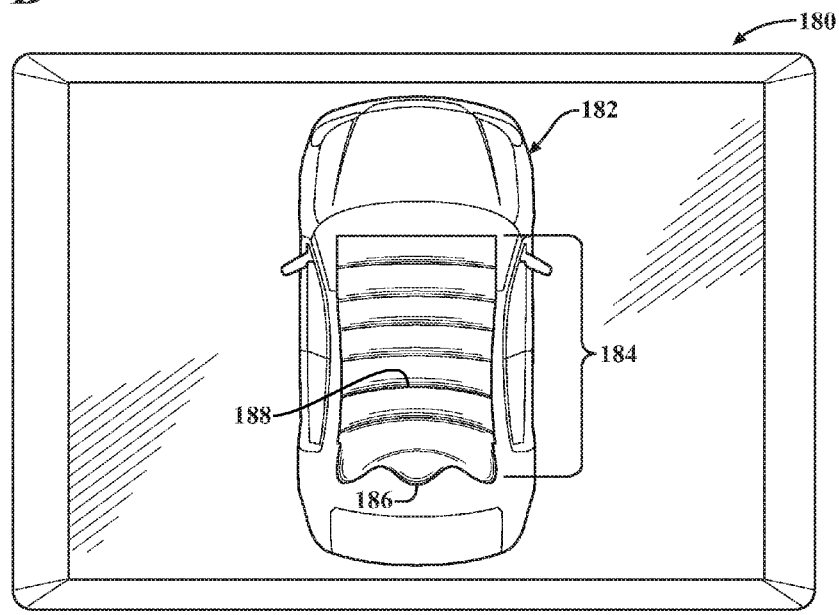
Figure 7C:
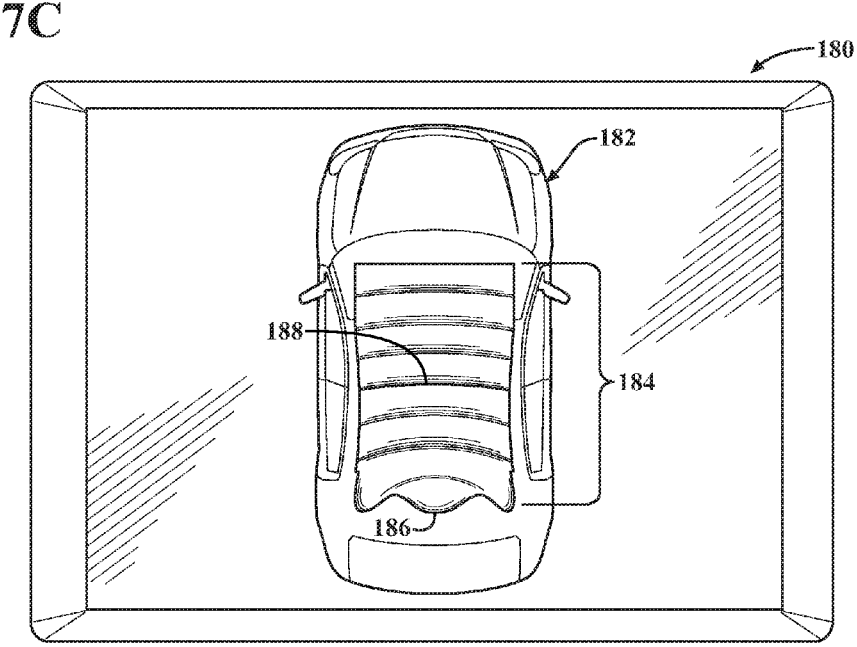
Figure 8A:
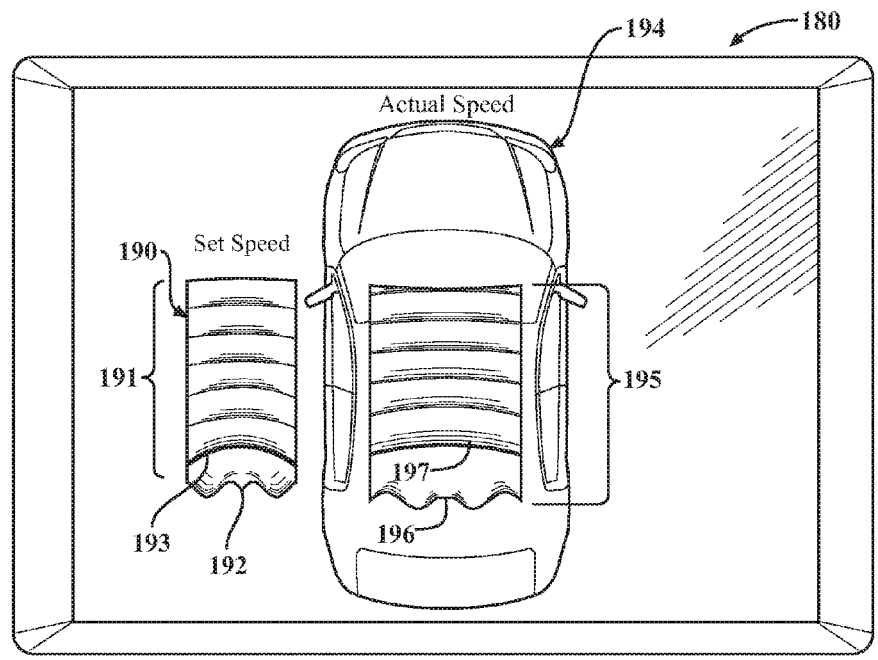
FIGS. 8A-8D show a second example of a spatiotemporal display.
Figure 8B:
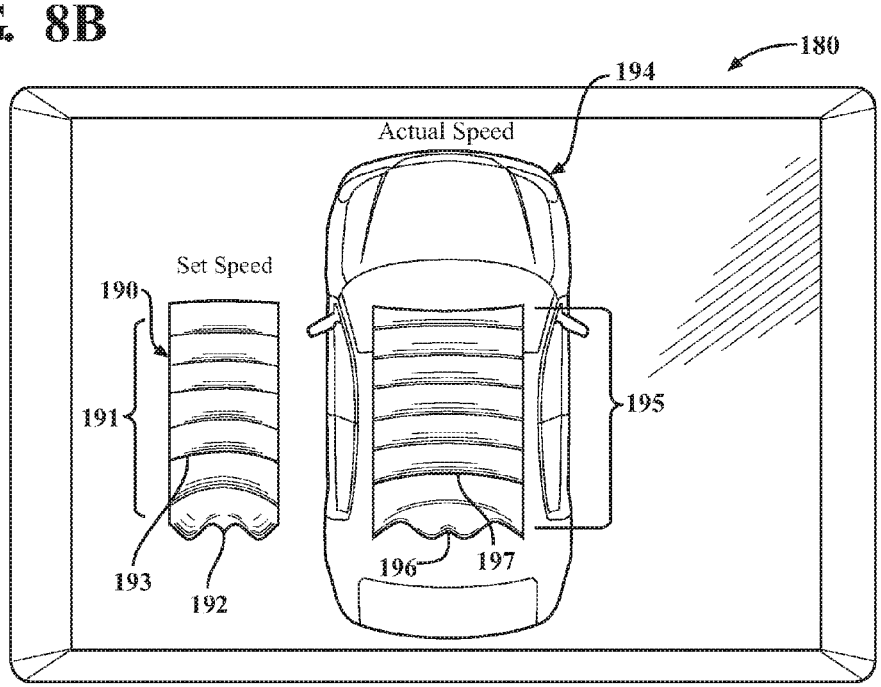
Figure 8C:
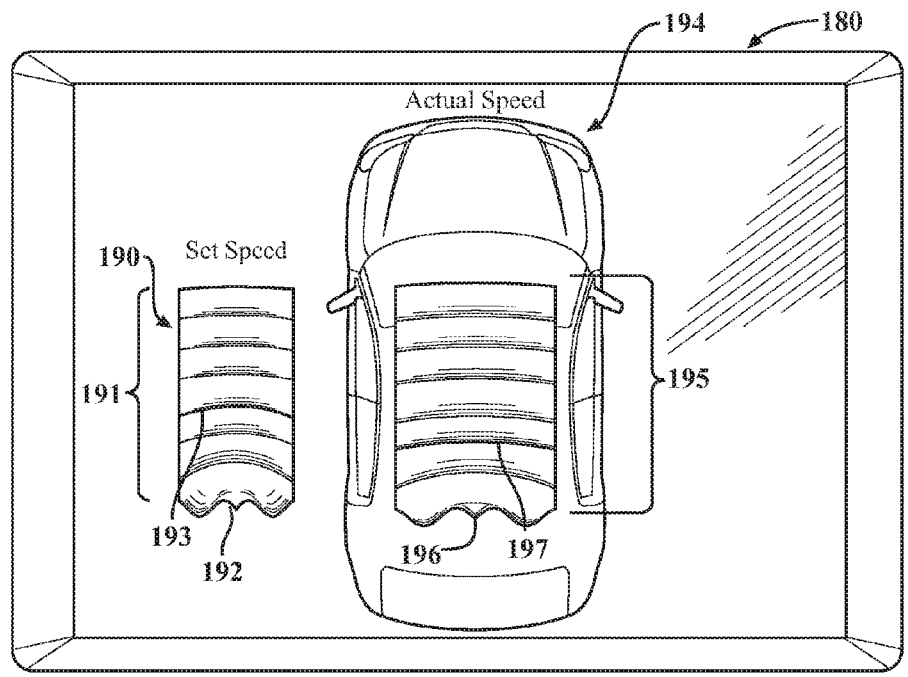
Figure 8D:
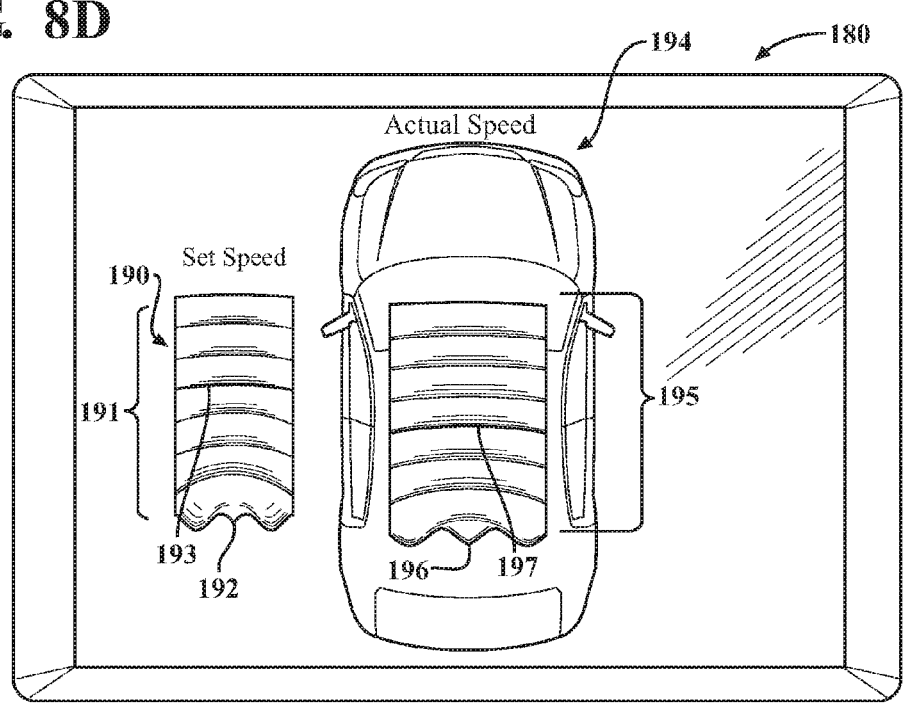

Referring to FIG. 4, an example of a method 400 of displaying set speed deviation for a vehicle is shown. At block 410, a set speed of the vehicle can be acquired. At block 420, an actual speed of the vehicle can be acquired from a speedometer. At block 430, a deviation between the set speed and the actual speed can be determined. The above description and examples relating to the blocks 210, 220, and 230 of the method 200 can be applicable to the blocks 410, 420, and 430 of the method 400.

At block 440, responsive to determining the deviation between the set speed and the actual speed, a spatiotemporal pattern can be caused to be displayed within the vehicle. In one or more arrangements, the spatiotemporal pattern can include a first wave pattern having a first frequency and a second wave pattern having a second frequency. The first wave pattern can indicate the set speed and the second wave pattern can indicate the actual speed. The deviation between the set speed and the actual speed can be indicated by the different in frequency between the first frequency and the second frequency. For example, the spatiotemporal pattern can include first and second wave patterns shown in FIGS. 8A-8D.

Non-limiting examples of the spatiotemporal displays in accordance with methods 200, 300, and/or 400 will now be described. Referring to FIGS. 5A-7C, a first example of a spatiotemporal display can be described. In one or more arrangements, spatiotemporal patterns can be displayed on the display(s) 180 of the output system 130 of the vehicle 100. As mentioned above, the display 180 can be any suitable in-vehicle display, such as a liquid crystal display (LCD), a light emitting diode (LED) display, and/or a heads-up display. The display(s) 180 can be provided in any suitable location within the vehicle 100.

In one or more arrangements, the spatiotemporal pattern can be displayed within an icon 182. For example, the icon 182 can be a graphical representation of a vehicle. In one or more arrangements, the spatiotemporal pattern can include a wave pattern 184. The wave pattern 184 can include multiple waves moving away from a wave source 186. For example, the wave pattern 184 can resemble a wave pattern resulting from an oscillating wave source 186. For exemplary purposes, a reference wave 188 can be shown to illustrate how the wave pattern 184 can change over time. In the examples shown in the Figures, the speed of the oscillation of the wave source 186 can change frequencies while distances between waves can remain the same. It is contemplated that other patterns, including those in which wave spacings, colors, and/or shapes change based on a frequency of oscillation. For example, as the frequency of oscillation increases, the distance between waves can decrease. Further, the color of the wave pattern 184 can change based on the frequency of oscillation.

As mentioned above, the direction of the wave pattern 184 can indicate whether an actual speed of the vehicle 100 is greater than, substantially equal to, and/or less than the set speed. For example, as shown in FIGS. 5A-6C, the wave source 186 can be located at a top portion of the display 180 and in a front portion of the icon 182. The wave pattern 184 can include waves moving away from the wave source 186, such as in a top-to-bottom direction relative to the display 180 and a front-to-rear direction relative to the icon 182. For example, in FIGS. 5A-5C and FIGS. 6A-6C, the reference wave 188 can be shown moving in such a direction. These spatiotemporal patterns can indicate that the actual speed of the vehicle 100 is less than the set speed.

In one or more arrangements, the wave source 186 can be located at a bottom portion of the display 180 and in a rear portion of the icon 182. (See FIGS. 7A-7C). The wave pattern 184 can include waves moving away from the wave source 186, such as in a bottom-to-top direction relative to the display 180 and a rear-to-front direction relative to the icon 182. (See the reference wave 188). This movement can indicate that the actual speed of the vehicle 100 is greater than the set speed. In one or more arrangements, the wave pattern 184 can remain substantially constant if the actual speed is substantially the same as the set speed. The position of the wave source 186 can change over time, as the actual speed and/or the set speed of the vehicle 100 changes.

As described above, the frequency of the wave pattern 184 can indicate a magnitude of the deviation between the set speed and the actual speed. For instance, the frequency of the wave pattern 184 can increase as the deviation between the set speed and the actual speed increases. FIGS. 5A-5C and FIGS. 6A-6C show non-limiting examples of spatiotemporal patterns taken over a period of time, and can indicate different magnitudes of deviation between the set speed and the actual speed of the vehicle. For example, the frequency of the wave pattern 184 of FIGS. 5A-5C can be greater than the frequency of the wave pattern 184 of FIGS. 6A-6C. Thus, the reference wave 188 in FIGS. 5A-5C can move away from the wave source 186 at a faster rate than the reference wave 188 in FIGS. 6A-6C. In these examples, the spatiotemporal patterns in FIGS. 5A-5C can indicate a larger deviation between the set speed and the actual speed (the vehicle 100 traveling slower than the set speed) relative to the spatiotemporal patterns in FIGS. 6A-6C.

In one or more arrangements, the deviation between the set speed and the actual speed can have predetermined frequencies of oscillation for the wave pattern 184. For instance, there can be a direct correlation between a magnitude of deviation between the set speed and the actual speed and a frequency of oscillation for the wave pattern 184.

In one or more arrangements, there can be a one or more frequency values for a range of deviations between the set speed and the actual speed. For example, a predetermined frequency of oscillation for the wave pattern 184 can be used for each predetermined range of deviations (e.g., 1-5 mph, 6-10 mph, 11-15 mpg). In one or more arrangements, predetermined frequencies and/or predetermined deviation ranges can be stored in the data store(s) 115.

Referring now to FIGS. 8A-8D, a second example of a spatiotemporal pattern can be described. In one or more arrangements, the spatiotemporal pattern can include a first spatiotemporal pattern 190 and a second spatiotemporal pattern 194. The first spatiotemporal pattern 190 can include a first wave pattern 191 including waves moving away from a first wave source 192. A first reference wave 193 can be shown in the first wave pattern 191. In one or more arrangements, the second spatiotemporal pattern 194 can include a second wave pattern 195 including waves moving away from a second wave source 196. A second reference wave 197 can be shown in the second wave pattern 195.

In one or more arrangements, the first wave pattern 191 can indicate a set speed of the vehicle. The second wave pattern 195 can indicate an actual speed of the vehicle. In some arrangements, the first wave pattern 191 and the second wave pattern 195 can be viewed together to indicate a deviation between the set speed and the actual speed. For example, the frequency of the first wave pattern 191 can be different than the frequency of the second wave pattern 195. In one or more arrangements, if the frequency of the second wave pattern 195 is greater that the frequency of the first wave pattern 191, this can indicate the actual speed is greater than the set speed. If the frequency of the second wave pattern 195 is less than the frequency of the first wave pattern 191, this can indicate the actual speed is less than the set speed. For example, in FIGS. 8A-8D, the frequency of the second wave pattern 195 is less than the frequency of the first wave pattern 191 (See the movement of the first reference wave 193 relative to the second reference wave 197). The magnitude of the deviation can be indicated by the magnitude in the difference of frequencies between the first wave pattern 191 and the second wave pattern 195.

In one or more arrangements, predetermined frequencies of oscillation can be applied to the first wave pattern 191 and/or the second wave pattern 195 for particular set speed and/or actual speeds. For example, the frequency of oscillation of the first wave pattern 191 can be directly correlated to the set speed of the vehicle 100. Further, the frequency of oscillation of the second wave pattern 195 can be directly correlated to the actual speed of the vehicle 100.

In one or more arrangements, there can be a one or more frequency values for a range of set speeds and/or actual speeds. For example, a predetermined frequency of oscillation for the first wave pattern 191 and/or the second wave pattern 195 can be used for a predetermined range of set speeds and/or actual speeds (e.g., 5-10 mph, 10-20 mph, 20-30 mpg, etc.). In one or more arrangements, predetermined frequencies and/or predetermined set speed and/or actual speed ranges can be stored in the data store(s) 115.

It will be appreciated that arrangements described herein can provide numerous benefits, including one or more of the benefits mentioned herein. For example, arrangements described herein can improve occupant comfort within the vehicle. Arrangements described herein can provide an aesthetic and convenient display to convey a deviation of a vehicle's actual speed to a target speed to a user. For example, a user can view a spatiotemporal display to quickly determine whether or not the vehicle is traveling faster or slower than a target speed. Further, the spatiotemporal display can allow a user to quickly determine a magnitude of deviation between the actual speed and the target speed. Arrangements described herein can eliminate the need for multiple numeric displays, avoiding the necessity of a user to manually determine a deviation between the actual speed and the target speed. Furthermore spatiotemporal patterns can allow a user to unconsciously monitor set speed deviations while performing a secondary task (such as talking on the phone, answering email, texting, and/or interacting with other occupants).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of displaying set speed deviation for a vehicle, the method comprising:
    acquiring a set speed for the vehicle;
    acquiring, using one or more sensors, an actual speed of the vehicle;
    determining a deviation between the set speed and the actual speed; and
    responsive to determining the deviation between the set speed and the actual speed, causing a spatiotemporal pattern to be displayed within the vehicle, the spatiotemporal pattern indicating the deviation between the set speed and the actual speed via a repeating pattern, wherein the spatiotemporal pattern includes a wave pattern having a wave source, the wave pattern moving away from the wave source.

2. The method of claim 1, wherein a frequency of the wave pattern indicates a magnitude of deviation between the set speed and the actual speed, wherein a higher frequency wave pattern indicates larger deviation between the set speed and the actual speed.

3. The method of claim 2, wherein a direction of the wave pattern indicates whether the actual speed is greater than or less than the set speed.

4. The method of claim 3, wherein a wave pattern moving in a downward direction within an in-vehicle display indicates the actual speed is less than the set speed, and a wave pattern moving in an upward direction within the in-vehicle display indicates the actual speed is greater than the set speed.

5. A method of displaying set speed deviation for a vehicle, the method comprising:
    acquiring a set speed for the vehicle;
    acquiring, using one or more sensors, an actual speed of the vehicle;
    determining a deviation between the set speed and the actual speed; and
responsive to determining the deviation between the set speed and the actual speed, causing a spatiotemporal pattern to be displayed within the vehicle, the spatiotemporal pattern indicating the deviation between the set speed and the actual speed via a repeating pattern, wherein the spatiotemporal pattern includes a first wave pattern having a first wave source and a second wave pattern having a second wave source, the first wave pattern indicative of the set speed and the second wave pattern indicative of the actual speed, the deviation between the set speed and the actual speed indicated by the difference in frequency between the first wave pattern and the second wave pattern.

6. A display system for a vehicle, the system comprising:
    a vehicle component configured to acquire a set speed for the vehicle;
    a sensor system, the sensor system being configured to acquire an actual speed of the vehicle; and
    a processor operatively connected to the vehicle component and the sensor system, the processor being programmed to initiate executable operations comprising:
        determining a deviation between the set speed and the actual speed; and responsive to determining the deviation between the set speed and the actual speed, causing a spatiotemporal pattern to be displayed within the vehicle, the spatiotemporal pattern indicating the deviation between the set speed and the actual speed via a repeating wave pattern.

7. The system of claim 6, wherein the vehicle component is an input system configured to receive an input indicating a set speed from a user.

8. The system of claim 6, wherein the vehicle component is a component of an autonomous driving system of the vehicle.

9. The system of claim 6, wherein the spatiotemporal pattern includes a wave pattern having a wave source, the wave pattern moving away from the wave source.

10. The system of claim 9, wherein the wave pattern is displayed within a vehicle icon.

11. The system of claim 10, wherein a frequency of the wave pattern indicates an amount of deviation between the set speed and the actual speed, wherein a higher frequency wave pattern indicates larger deviation between the set speed and the actual speed.

12. The system of claim 11, wherein a direction of the wave pattern indicates whether the actual speed is greater than or less than the set speed.

13. The system of claim 12, wherein a wave pattern moving in a rearward direction within the vehicle icon indicates the actual speed is less than the set speed, and a wave pattern moving in a forward direction within the vehicle icon indicates the actual speed is greater than the set speed.

14. The system of claim 6, wherein the spatiotemporal pattern includes a first wave pattern having a first wave source and a second wave pattern having a second wave source, the first wave pattern indicative of the set speed and the second wave pattern indicative of the actual speed, the deviation between the set speed and the actual speed indicated by the difference in frequency between the first wave pattern and the second wave pattern.

15. A vehicle comprising the display system in accordance with claim 6.

16. A method of displaying set speed deviation for a vehicle, the method comprising:
    acquiring a set speed for the vehicle;
    acquiring, using one or more sensors, an actual speed of the vehicle;
    determining a deviation between the set speed and the actual speed; and
    responsive to determining the deviation between the set speed and the actual speed, causing a spatiotemporal pattern to be displayed within the vehicle, the spatiotemporal pattern including a repeating wave pattern moving away from a wave source, a frequency of the wave pattern indicating an amount of deviation between the set speed and the actual speed, and a direction of the wave pattern indicating whether the actual speed is greater than or less than the set speed.

17. A method of displaying set speed deviation for a vehicle, the method comprising:
    acquiring a set speed for the vehicle;
    acquiring, from a speedometer, an actual speed of the vehicle;
    determining a deviation between the set speed and the actual speed; and
    responsive to determining the deviation between the set speed and the actual speed, causing a spatiotemporal pattern to be displayed within the vehicle, the spatiotemporal pattern including a first wave pattern having a first frequency and a second wave pattern having a second frequency, the first wave pattern indicating the set speed and the second wave pattern indicating the actual speed, the deviation between the set speed and the actual speed being indicated by the difference in frequency between the first frequency and the second frequency.

* * * * *